(12) United States Patent
Luibrand et al.

(10) Patent No.: US 6,176,342 B1
(45) Date of Patent: Jan. 23, 2001

(54) VEHICLE STEERING APPARATUS

(75) Inventors: Thomas William Luibrand, Wytheville, VA (US); John Walter Spetz, Morristown, TN (US)

(73) Assignee: TRW Inc., Lyndhurst, OH (US)

( * ) Notice: Under 35 U.S.C. 154(b), the term of this patent shall be extended for 0 days.

(21) Appl. No.: 09/099,711

(22) Filed: Jun. 19, 1998

(51) Int. Cl.[7] ................................................... B62D 5/12
(52) U.S. Cl. ........................ 180/427; 180/417; 180/434
(58) Field of Search ................................. 180/417, 426, 180/427, 428, 434, 440; 277/572, 585; 384/15, 16

(56) References Cited

U.S. PATENT DOCUMENTS

| | | |
|---|---|---|
| 4,211,152 | 7/1980 | Colletti et al. . |
| 4,214,643 * | 7/1980 | Yamanaka et al. .................. 180/428 |
| 4,280,741 * | 7/1981 | Stoll ...................................... 384/16 |
| 4,488,615 * | 12/1984 | Millard ................................. 180/428 |
| 4,582,303 * | 4/1986 | Tylor .................................... 277/572 |
| 4,721,175 * | 1/1988 | Butler ................................... 180/428 |
| 4,729,145 * | 3/1988 | Egner-Walter et al. ............... 384/16 |
| 4,788,877 | 12/1988 | Robinson et al. . |
| 4,809,806 | 3/1989 | Pietrzak et al. . |
| 5,009,066 * | 4/1991 | VanGorder et al. ................. 180/417 |
| 5,213,174 | 5/1993 | Adams . |
| 5,285,864 | 2/1994 | Martin et al. . |
| 5,505,276 * | 4/1996 | Luibrand ............................. 180/417 |
| 5,531,287 * | 7/1996 | Sherman ............................. 180/417 |
| 5,735,528 * | 4/1998 | Olsson ................................ 277/585 |
| 5,816,360 * | 10/1998 | Spilner ................................ 180/417 |
| 5,890,394 * | 4/1999 | Anderson ........................... 180/428 |

FOREIGN PATENT DOCUMENTS

| | | |
|---|---|---|
| 62-122775 | 8/1987 | (JP) . |
| 526727 | 4/1993 | (JP) . |
| 5193509 | 8/1993 | (JP) . |
| 612263 | 2/1994 | (JP) . |
| 6144255 | 5/1994 | (JP) . |
| 6227416 | 8/1994 | (JP) . |

* cited by examiner

*Primary Examiner*—Brian L. Johnson
*Assistant Examiner*—Michael Cuff
(74) *Attorney, Agent, or Firm*—Tarolli, Sundheim, Covell, Tummino & Szabo L.L.P.

(57) ABSTRACT

An apparatus (10) includes a hydraulic fluid power cylinder (116) and a steering rack (118). The rack (118) is fixed to a piston (160) in the power cylinder (116), and extends outward through an open end (172) of the power cylinder (116). An annular hydraulic fluid seal (164) is received over the rack (118) in dynamic sealing contact with the rack (118). The seal (164) defines a fixed end of a variable volume hydraulic fluid chamber (173) extending from the piston (160) to the seal (164). The apparatus (10) further includes a housing part (114) which is mounted on the power cylinder (116). The housing part (114) supports the seal (164) at a location spaced outward from the open end (172) of the power cylinder (116). In this arrangement, the housing part (114) defines an end section (191) of the fluid chamber (173) extending outward from the open end (172) of the power cylinder (116) to the seal (164).

8 Claims, 1 Drawing Sheet

VEHICLE STEERING APPARATUS

FIELD OF THE INVENTION

The present invention relates to a hydraulically-assisted rack and pinion steering gear, and particularly relates to a housing for the steering gear.

BACKGROUND OF THE INVENTION

A hydraulically-assisted rack and pinion steering gear includes a steering rack, a pinion gear in mesh with the rack, and a hydraulic fluid control valve. The rack is movable longitudinally, and is connected at its opposite ends to a vehicle steering linkage. When the rack moves, it actuates the steering linkage to effect steering movement of an associated pair of steerable vehicle wheels.

Such a steering gear includes a housing which contains the rack, the pinion gear, and the valve. The rack extends through a horizontal section of the housing. The valve is contained in a tower section of the housing which projects upward from the horizontal section.

The horizontal section of the housing includes a hydraulic fluid power cylinder. A piston in the power cylinder is fixed to the rack. The valve cooperates with the pinion gear to control the hydraulic fluid pressure in the power cylinder in response to steering input from an operator of the vehicle. This causes the piston, and hence the rack, to move in response to the steering input so that the vehicle wheels are steered accordingly.

An example of a prior art steering gear is shown partially in FIG. 1. The steering gear 10 of FIG. 1 has a horizontal housing section 12 in which a steering rack 14 is supported for movement back and forth along a longitudinal axis 15. The horizontal housing section 12 is defined in part by a hydraulic fluid power cylinder 16 and in part by a mounting structure 18. The rack 14 projects longitudinally outward from the horizontal housing section 12 in a direction extending from left to right, as viewed in FIG. 1. An outer end portion (not shown) of the rack 14 is connectable with a vehicle steering linkage in a known manner.

A cylindrical body portion 20 of the mounting structure 18 is received over the power cylinder 16 in an interference fit with the power cylinder 16. A radially-projecting racket portion 22 of the mounting structure 18 defines a bore 24. The bore 24 receives a bushing which, in turn, receives a fastener structure that fastens the steering gear 10 to a load-bearing structural part of a vehicle.

Other parts of the steering gear 10 that are shown in FIG. 1 include a seal carrier 30 and a lock ring 32. The seal carrier 30 is an annular structure extending into the power cylinder 16 concentrically between the rack 14 and the power cylinder 16. An inner end surface 34 of the seal carrier 30 defines an outer end of a variable volume hydraulic fluid chamber 36. An annular hydraulic fluid seal 38 (shown schematically) is supported on the seal carrier 30 in dynamic sealing contact with the rack 14. An O-ring seal 40 is supported by the seal carrier 30 in static sealing contact with the power cylinder 16. The lock ring 32 is received concentrically over the rack 14 in screw-threaded engagement with the body portion 20 of the mounting structure 18. The seals 38 and 40 are thus retained in their installed positions at the end of the power cylinder 16 y the seal carrier 30, the lock ring 32 and the mounting structure 18.

SUMMARY OF THE INVENTION

In accordance with the present invention, an apparatus comprises a hydraulic fluid power cylinder and a steering rack. The rack is fixed to a piston in the power cylinder, and extends outward through an open end of the power cylinder. An annular hydraulic fluid seal is received over the rack in dynamic sealing contact with the rack. The seal defines a fixed end of a variable volume hydraulic fluid chamber extending from the piston to the seal.

The apparatus further comprises a housing part which is mounted on the power cylinder. The housing part supports the seal at a location spaced outward from the open end of the power cylinder. In this arrangement, the housing part defines an end section of the fluid chamber extending outward from the open end of the power cylinder to the seal.

BRIEF DESCRIPTION OF THE DRAWINGS

Further features of the present invention will become apparent to those skilled in the art to which the present invention relates from reading the following description with reference to the accompanying drawings, in which.

DESCRIPTION OF PREFERRED EMBODIMENT

Figure 1:
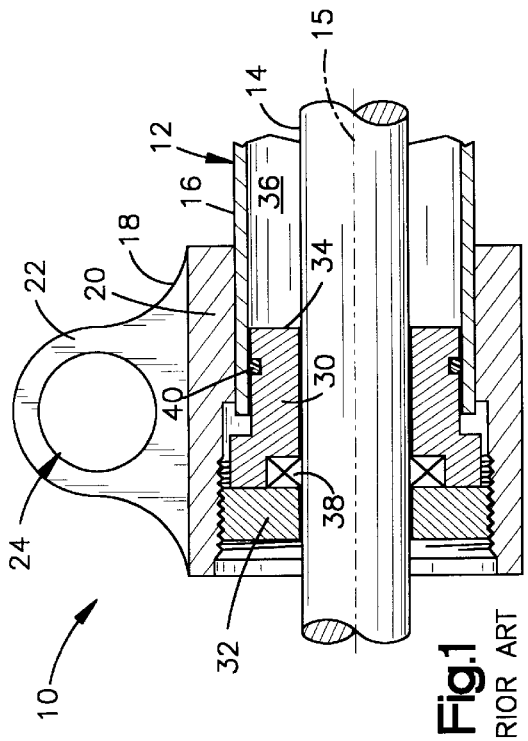
FIG. 1 is a partial view of a prior art steering gear.
Figure 2:
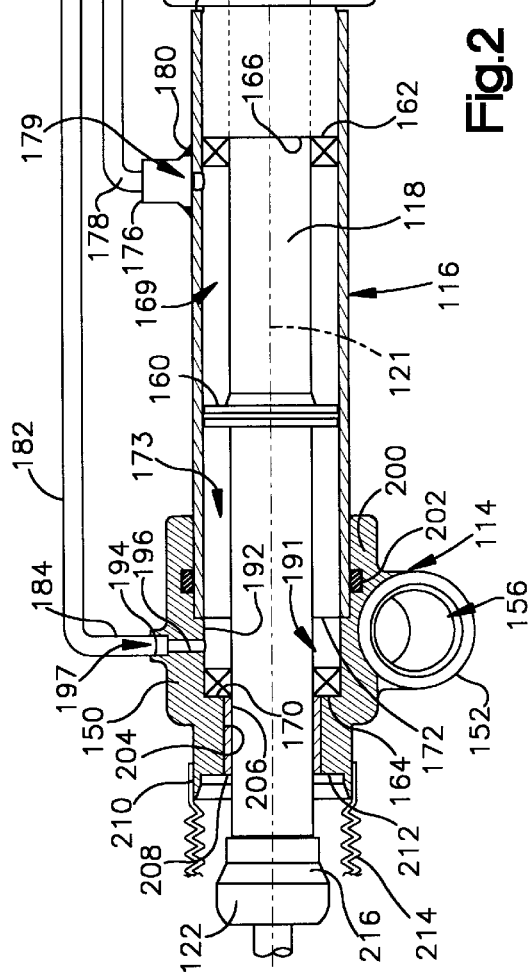
FIG. 2 is a partly schematic view of a vehicle steering system including a steering gear comprising a preferred embodiment of the present invention.

A vehicle steering system 100 is shown in FIG. 2. The steering system 100 includes a hydraulically-assisted rack and pinion steering gear 102 comprising a preferred embodiment of the present invention. The steering system 100 further includes a hydraulic fluid reservoir 104 and a pump 106 for pumping hydraulic fluid from the reservoir 104 to the steering gear 102.

The steering gear 102 includes a housing 110 with three major parts 112, 114 and 116. A steering rack 118 extends fully through the three parts 112, 114 and 116 of the housing 110, and is movable longitudinally back and forth along a horizontal axis 121. A pair of all joints 122 connect the rack 118 at its opposite ends to a vehicle steering linkage (not shown) which, in turn, connects the steering gear 102 to a pair of steerable vehicle wheels.

The first housing part 112 is a one-piece structure. By "one-piece" it is meant that the first housing part 112 is made from a single homogenous material, and is a single unit exclusive of separate but joined elements. Preferably, the single homogenous material is a material comprised at least sustantially of aluminum, i.e., aluminum or an aluminum alloy. A base portion 124 of the first housing part 112 has a generally cylindrical configuration centered on the axis 121. A tower portion 126 of the first housing part 112 projects upward from the base portion 124, and is centered on a corresponding axis 127.

A hydraulic fluid control valve 130 is contained in the tower 126. An input shaft 132 projects from the tower 126 along the axis 127. The input shaft 132 is connected with the vehicle steering wheel (not shown) in a known manner, and is rotatable about the axis 127 in response to rotation of the steering wheel. A pinion gear 134 is connected with the input shaft 132 by a torsion bar 136. The pinion gear 134 is rotatable about the axis 127 in mesh with a row of rack teeth 138 on the rack 118.

A mounting portion 140 of the first housing part 112 projects from the base portion 124. The mounting portion 140 has a cylindrical shape defining a bore 144. The bore 144 receives a fastener structure (not shown) that fastens the steering gear 102 to a load-bearing structural part of the vehicle. Such a fastener structure may comprise, for example, a bushing and a fastener shank, each of which may have any suitable configuration known in the art.

The second housing part 114 also is a one-piece structure made from a single homogeneous material comprised at least substantially of aluminum. A base portion 150 of the second housing part 114 has a generally cylindrical configuration centered on the axis 121. A mounting portion 152 of the second housing part 114 projects from the base portion 150. Like the mounting portion 140 of the first housing part 112, the mounting portion 152 of the second housing part 114 has a cylindrical shape defining a bore 156 for receiving a fastener structure, such as a bushing and a fastener shank, for fastening the steering gear 102 to the vehicle in a known manner.

The third housing part 116 is a hydraulic fluid power cylinder in the form of a steel tube. The tube 116 is centered on the axis 121, and extends axially between the first and second housing parts 112 and 114. A piston 160 is fixed to the rack 118 within the tube 116. A pair of annular hydraulic fluid seals 162 and 164 (shown schematically) are received over the rack 118 in dynamic sealing contact with the rack 118, and are contained in the housing 110 on opposite sides of the piston 160. Specifically, the first seal 162 is located within the tube 116, and abuts an annular end surface 166 of the first housing part 112 that is spaced axially inward from the adjacent open end 168 of the tube 116. A first variable volume hydraulic fluid chamber 169 extends axially from the piston 160 to the first seal 162. The first fluid chamber 169 is thus defined entirely within the tube 116.

The second seal 164 is located within the second housing part 114, and abuts an annular inner surface 170 of the second housing part 114 that is spaced axially outward from the adjacent open end 172 of the tube 116. A second variable volume hydraulic fluid chamber 173 extends axially from the piston 160 to the second seal 164. The second fluid chamber 173 is thus defined partially within the tube 116 and partially within the second housing part 114. Each of the seals 162 and 164, as well as the piston 160, may comprise any suitable structure known in the art.

The valve 130 communicates with the first fluid chamber 169 through a first two-way conduit 174. A connector stud 176 supports an outer end portion 178 of the first conduit 174 over a port 179 in the tube 116. The port 179 is drilled through the tube 116, and the stud 176 is fixed to the tube 116 by a weld 180, as known in the art. The valve 130 communicates with the second fluid chamber 173 through a second two-way conduit 182. As described more fully below, the second housing part 114 supports an outer end portion 184 of the second conduit 182 in accordance with the present invention.

As shown schematically in FIG. 2, the valve 130 receives hydraulic fluid from the pump 106 through an inlet conduit 186. An outlet conduit 188 exhausts hydraulic fluid from the valve 130 to the reservoir 104. The valve 130 cooperates with the pinion gear 134 to vary the hydraulic fluid pressure in the first and second fluid chambers 169 and 173 in response to rotation of the input shaft 132. This provides hydraulic fluid power which assists movement of the piston 160 and the rack 118 along the axis 121 and thereby assists steering movement of the vehicle wheels in amounts and directions corresponding to rotation of the vehicle steering wheel.

As noted above, an end section 191 of the second fluid chamber 173 is defined within the second housing part 114 between the second seal 164 and the adjacent open end 172 of the tube 116. In accordance with this feature of the present invention, a cylindrical inner surface 192 of the second housing part 114 defines the peripheral boundary of that section 191 of the second fluid chamber 173. A pair of smaller cylindrical inner surfaces 194 and 196 together extend radially outward from the cylindrical inner surface 190 to an outer peripheral surface 196. Those surfaces 194 and 196 define a hydraulic fluid port 197 communicating the end section 191 of the second fluid chamber 173 with the exterior of the housing 110. The outer end portion 184 of the second two-way conduit 182 is received in the port 197 to communicate the valve 130 with the second fluid chamber 173. This eliminates the need for a second welded connector stud like the connector stud 176 at the opposite end of the first chamber 169.

In accordance with another feature of the present invention, the second housing part 114 has a tubular section 200 projecting axially over the tube 116 in an interference fit with the tube 116. An O-ring seal 202 is compressively engaged radially between the tubular section 200 and the tube 116. The interference fit with the tube 116 and the abutment with the second seal 164 enable the second housing part 114 exclusively to retain the second seal 164 in place at the outer end of the second fluid chamber 173. Therefore, other parts such as a seal carrier and/or a locking ring are not required to help retain the second seal 164 in place.

The second housing part 114 further has a reduced-diameter cylindrical inner surface 204 in an interference fit with a rack sleeve 206 which, in turn, has a cylindrical inner surface 208 in axial sliding contact with the rack 118. The second housing part 114 thus helps to support the rack 118 for longitudinal movement along the axis 121. Other structural features of the second housing part 114 include a cylindrical outer surface 210 and an annular outer end surface 212. The cylindrical outer surface 220 supports a bellows 214 (shown partially). The annular outer end surface 212 faces axially toward an opposed annular surface 216 on the adjacent all joint 122, and is located in the path of movement of that surface 216 so as to function as a stop surface for limiting movement of the second all joint 122 from left to right as viewed in FIG. 2.

From the above description of the invention, those skilled in the art will perceive improvements, changes and modifications. Such improvements, changes and modifications within the skill of the art are intended to be covered by the appended claims.

Having described the invention, the following is claimed:

1. Apparatus comprising:
    a hydraulic fluid power cylinder;
    a piston in said power cylinder;
    a steering rack fixed to said piston, said rack extending outward through an open end of said power cylinder;
    an annular hydraulic fluid seal received over said rack in dynamic sealing contact with said rack, said seal defining a fixed end of a variable volume hydraulic fluid chamber extending from said piston to said seal;
    a housing part directly mounted on said power cylinder, said housing part being separate from said seal and supporting said seal at a location spaced outward from said open end of said power cylinder and adjacently supporting said seal within said fluid chamber, whereby said housing part defines an end section of said fluid chamber extending outward from said open end of said power cylinder to said seal; and
    a rack sleeve located between said housing part and said rack, said rack sleeve having a surface in axial sliding contact with said rack, said housing part having a surface in an interference fit with said rack sleeve.

2. Apparatus as defined in claim 1 wherein said power cylinder is part of a housing structure having a tower portion containing a hydraulic fluid control valve, said housing part being separate and remote from said tower portion of said housing structure.

3. Apparatus as defined in claim 2 wherein said housing part has a hydraulic fluid port communicating said end section of said fluid chamber with the exterior of said housing part.

4. Apparatus as defined in claim 3 wherein said housing part has a mounting portion which is shaped to engage a fastener structure that fastens said housing part to a vehicle.

5. Apparatus as defined in claim 3 wherein said housing part has a tubular portion received over said power cylinder in an interference fit with said power cylinder.

6. Apparatus as defined in claim 3 further comprising a all joint fixed to said rack, said housing part having an annular stop surface in the path of movement of an opposed annular surface on said all joint.

7. Apparatus as defined in claim 3 wherein said housing part is a one-piece structure.

8. Apparatus as defined in claim 7 wherein said one-piece structure is a machined metal casting.

* * * * *